United States Patent [19]
Hasegawa et al.

[11] Patent Number: 4,912,311
[45] Date of Patent: Mar. 27, 1990

[54] INFORMATION RECORDING CARRIER

[75] Inventors: Koyo Hasegawa, Tokyo; Masakuni Yamamoto, Atsugi; Hiroaki Hoshi, Isehara, all of Japan

[73] Assignee: Canon Kabushiki Kaisha, Tokyo, Japan

[21] Appl. No.: 384,902

[22] Filed: Jul. 25, 1989

Related U.S. Application Data

[63] Continuation of Ser. No. 904,359, Sep. 8, 1986, abandoned.

[30] Foreign Application Priority Data

Sep. 10, 1985 [JP] Japan .................................. 60-199924
Sep. 11, 1985 [JP] Japan .................................. 60-201373
Dec. 23, 1985 [JP] Japan .................................. 60-287907
Sep. 10, 1988 [JP] Japan .................................. 63-199923

[51] Int. Cl.$^4$ ............................................ G11B 7/007
[52] U.S. Cl. .................................... 235/487; 235/494; 369/46
[58] Field of Search ............... 235/487, 449, 454, 456, 235/462, 493, 494; 360/2, 77, 78; 369/44, 43, 275, 276; 346/135.1, 137

[56] References Cited

U.S. PATENT DOCUMENTS 3,806,643 4/1974 Russell .................................. 369/125
3,919,697 11/1975 Walker .................................. 340/173
4,270,043 5/1981 Baxter .................................. 235/487
4,598,393 7/1986 Pierce .................................. 369/46

FOREIGN PATENT DOCUMENTS 0146257 6/1985 European Pat. Off. .
8501818 4/1985 PCT Int'l Appl. .
2159993 12/1985 United Kingdom .

OTHER PUBLICATIONS

IEEE Transactions on Magnetics, vol. Mag-No. 3, Sep. 1972, pp. 416-420, New York, U.S.
E. E. Gray: "Laser Mass Memory System".

Primary Examiner—Bruce A. Reynolds
Assistant Examiner—Leon K. Fuller
Attorney, Agent, or Firm—Fitzpatrick, Cella, Harper & Scinto

[57] ABSTRACT

An information recording medium comprising a plurality of information tracks on which information is recorded, and separating regions for separating each of said information tracks from the other information tracks, each of said separating regions including a record section consisting of code of a shape or magnitude different from code in said information tracks.

11 Claims, 11 Drawing Sheets

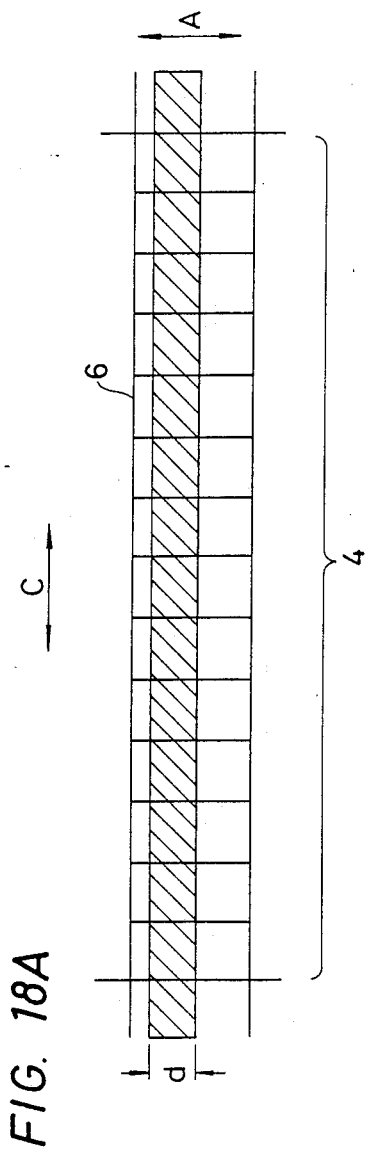
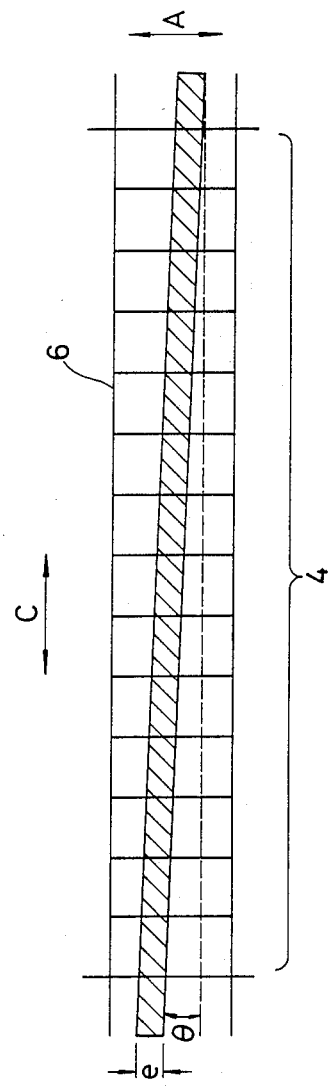
FIG. 18A
FIG. 18B

INFORMATION RECORDING CARRIER

This application is a contrinuation-in-part of application Ser. No. 904,359 filed Sept. 8 1986 now abandoned.

BACKGROUND OF THE INVENTION

1. Field of the Invention

The present invention relates to a medium or carrier on which information is recorded and particularly such a carrier having a particular format by which information can accurately be reproduced.

RELATED BACKGROUND ART

Recently, there have been proposed many types of optical recording and reproducing systems using recording carriers such as optical files, compact discs and so on. More recently, an optical card-like recording carrier (hereinafter referred to an "optical card") has been developed which is more convenient in portability and has a capacity larger than those of the aforementioned recording carriers. The best way to use such optical card is accordingly becoming an object of study.

FIG. 1 is a diagrammatical plan view showing a recording format in an optical card.

In this figure, the optical card 1, which is a recording carrier, includes a recording area 2 thereon. The recording area 2 is formed by a plurality of juxtaposed bands 3 each of which in turn is formed by tracks 4 and start and stop bits which are arranged as will be described. Each of the tracks 4 has an information capacity on the order of several tens to one hundred bits. A band is separated from an adjacent band or bands by means of a reference line or lines which will be called the "R-line" or "R-lines". Arrow A indicates the direction of movement of the optical card 1 for reproducing information.

FIG. 2 is a schematic diagram of an optical card reproducing apparatus.

In this figure, the optical card 1 is movable in the direction of arrow A by a rotating mechanism 6. Information recorded on the optical card 1 is read out and reproduced by an optical head 11, this procedure being performable for each track. First of all, rays from a source of light 7 such as LED or the like are condensed by a lens system 8 into a condensed beam for illuminating a track 4 on which information to be read out is recorded. The illuminated track 4 is imaged through an optical imaging system 9 onto a one-dimensional sensor array 10 the output of which in turn generates electric signals corresponding to the recorded information on the track 4. As the reading-out is terminated for said track 4, the optical card 1 is moved in the direction of arrow A, or the optical head 11 is moved in the direction in which the band 3 are arranged, that is, in the direction shown by arrow C, such that the reading-out of information can similarly be effected for the next track.

FIG. 3 is a diagrammatically enlarged view showing a part of the conventional recording format shown in FIG. 1. In FIG. 3, hatched and blanked portions represent "1" and "0", respectively.

As seen from FIG. 3, the information track 4 is located between a start bit 21 indicative of the start of the information track 4 and a stop bit 22 indicative of the end of the same. The start and stop bits 21 and 22 are opposite in optical property from each other. For example, if one of those two bits is "1", the other is "0". Moreover, the optical properties of the bits 21 and 22 on one track are inverted relative to those of the bits 21 and 22 on the adjacent track or tracks.

R-line 5 is in the form of a stripe formed by two bits as shown. Reading operation of the sensor array 10 for each track 4 is initiated when information "001100" on the separating region including a two-bit R-line 5 is detected. At the same time, information of the start bit 21 is recorded. On termination of the reading for that track 4, information of the stop bit 22 is recorded. If the information of both the bits 21 and 22 has thus been recorded, the sensor array 10 can recognize the initiation of reading of a new information track since the information of the bits 21 and 22 is inverted from one track to another. Such means for detecting new track is required when the scanning of the sensor array 10 is non-synchronized with the movement of the optical card resulting in a plurality of scannings by the sensor array 10 for one information track.

However, the aforementioned type of recording format has a problem in that, since an information track may include the same information as that of the separating region including the R-line information ("001100" in this case), the R-line and information track cannot sufficiently be distinguished from other R-lines and tracks, respectively.

It can easily occur that an information track to be read is located completely out of parallel to the one-dimensional sensor array 10, resulting perhaps from an irregularity produced in manufacturing the recording carrier or a condition of use. In such a case, the aforementioned type of recording format may result in two tracks being simultaneously imaged as right- and left-hand images on the one-dimensional sensor array 10. More particularly, where the width of an information track in said direction is equal to that of an R-line substantially perpendicular to the information track, information subsequent to the R-line is not necessarily information on a track corresponding to the detected R-line even if the R-line is perfectly imaged on the one-dimensional sensor array 10. This results in reduction of the accuracy on reading the information of the track.

SUMMARY OF THE INVENTION

It is therefore an object of the invention to provide an information recording carrier which can reproduce information in an improved accurate manner at all times.

Another object of the present invention is to provide an information recording carrier which can accurately read information on a track, particularly, even if this track storing the information is not located parallel to a sensor array for reproducing the information on that track.

To accomplish the first-mentioned object, the information recording carrier according to the present invention comprises a plurality of information tracks on which information is recorded and first and second regions respectively formed on the forward and rearward regions of each of said information tracks, said first and second regions being used to separate and distinguish each of the information tracks from the other information tracks.

To accomplish the second-mentioned object, the information recording carrier according to the present invention comprises a plurality of information tracks on which information is recorded and regions for separating and distinguishing each of said information tracks

BRIEF DESCRIPTION OF THE DRAWINGS

FIG. 18A illustrates the region of an optical card read by a CCD type array.

FIG. 18B illustrates the region of the optical card read by an MOS type array.

DETAILED DESCRIPTION OF THE PREFERRED EMBODIMENTS

The present invention will now be described by way of example with reference to the drawings.

Figure 4:
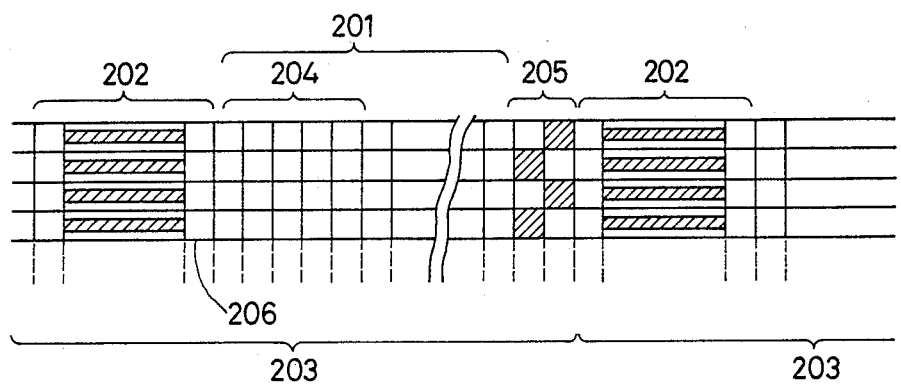
FIG. 4 is a diagrammatic view showing a recording format in one embodiment of an information recording carrier according to the present invention.

Referring now to FIG. 4, an information track 201 is separated from adjacent information tracks by separating regions 202 in the direction of bit arrangement. A discrimination region 205 is provided between the information track 201 and the separating region 202. The discrimination region 205 also functions as an end bit of the corresponding information track 201. By the presence of the discrimination region 205, the information track can be separated and distinguished from adjacent information tracks in the direction substantially perpendicular to the direction of bit arrangement.

A band 203 is formed by a plurality of arranged tracks each of which consists of an information track 201, a separating region 202 and a discrimination region 205. A plurality of such bands 203 is arranged with the line of the separating regions 202 in the bands 203 forming an R-line for separating adjacent information tracks from each other.

The information track 201 includes unit data regions 204 each of which is formed by, e.g., five bits. Data stored in each of the unit data regions 204 are subjected to a 4/5 modulation in accordance with a conversion rule shown in the following table and then to an NRZI modulation before they are recorded.

TABLE

| DATA | CODE | |
|------|------|------|
|      | MBS  | LBS  |
| 0000 | 11001 |    |
| 0001 | 11011 |    |
| 0010 | 10010 |    |
| 0011 | 10011 |    |
| 0100 | 11101 |    |
| 0101 | 10101 |    |
| 0110 | 10110 |    |
| 0111 | 10111 |    |
| 1000 | 11010 |    |
| 1001 | 01001 |    |
| 1010 | 01010 |    |
| 1011 | 01011 |    |
| 1100 | 11110 |    |
| 1101 | 01101 |    |
| 1110 | 01110 |    |
| 1111 | 01111 |    |

Figure 5:
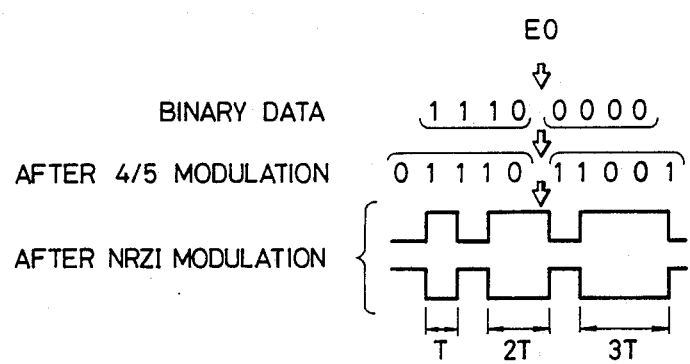
FIG. 5 illustrates the 4/5 modulating system used in the first-mentioned embodiment of the present invention.

Referring next to FIG. 5, there is shown sexadecimal digit data E$\phi$ which is subjected to 4/5 conversion and then NRZI modulation. Signals recorded in accordance with NRZI modulation include only signals having lengths of T, 2T and 3T where T is minimum interval of inversion and corresponds to one bit in the recording format shown in FIG. 4. In other words, information recorded on each of the information tracks 201 will not include a interval of inversion equal to or longer than 4T.

In the present embodiment, therefore, a region having a interval of inversion equal to 4T is used as a separating region 202 for separating an information track from an adjacent track. For example, as shown in FIG. 5, a separation signal "100001" is previously recorded in the direction of reading or arrangement for information tracks. It is a matter of course that the present invention is not limited to such an arrangement and can similarly be applied to any arrangement as long as the read information can be distinguished from other information.

The information track 201 has sixteen unit data regions 204 with the total number of bits equal to eighty. The present embodiment does not include a preamble region for obtaining a self-lock on reproducing. However, it may have such a preamble region.

In such a manner, R-lines can positively be detected since each of the separating regions 202 includes a continuous and identical code which does not appear in the corresponding information track 201.

Figure 6:
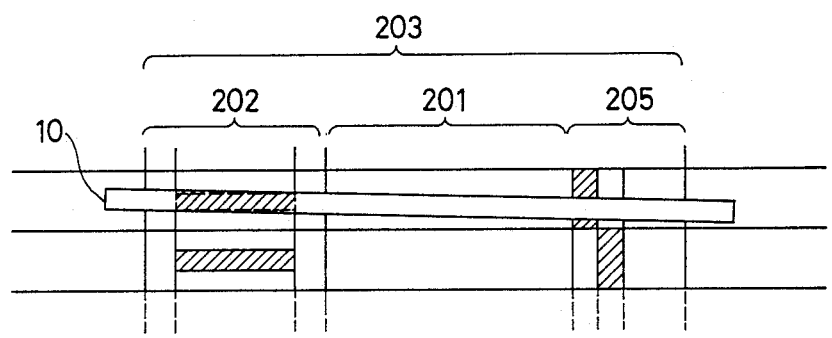
FIG. 6 illustrates the relationship between a track having a reference line and a one-dimensional sensor array in the first embodiment of the present invention.
Figure 7:
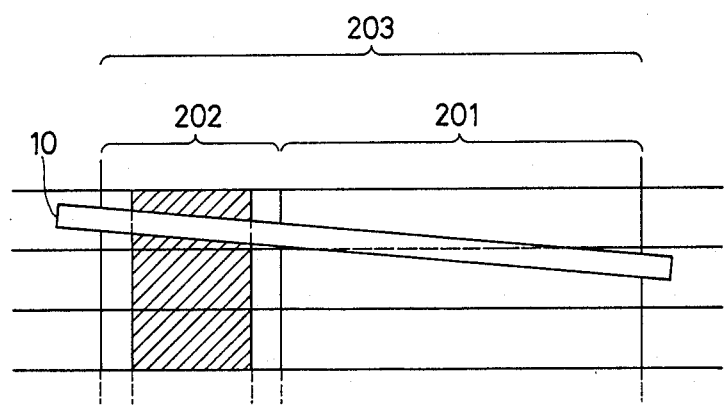
FIG. 7 illustrates the relationship between a track having a reference line and the one-dimensional sensor array in the prior art.

Moreover, by forming the information recording width of the R-line smaller than the width of the information track except the R-line, it is assured that the one-dimensional sensor array 10 is entirely located on the same information track when the R-line 202 is perfectly read by the one-dimensional sensor array 10 and even if the one-dimensional sensor array 10 is out of parallel to the region of the information track 201 which is to be read by the sensor array 10, as shown in FIG. 6. In the embodiment shown in FIG. 1, the ratio of the track width of the data region to the information recording width of the R-line is selected to be about 1:2. If the information record width of the R-line is equal to the width of the information track except the R-line, the accuracy on reading the information track can be reduced since the right-hand end of the one-dimensional sensor array 10 may be reading an informtion line different from the R-line 202 even if the R-line is perfectly read as shown in FIG. 7.

If the information record width of the R-line is smaller than the width of the information track, a new information track can be discriminated from the old information track by the fact that the information of the R-line is inverted on each shift to the new information track.

The discrimination region 205 is formed by two or more bits with a modified bit pattern between each two adjacent tracks. Thus, the discrimination region 205 serves as an end bit and will have its changed information as each of new information tracks is selected. Thus, the selection of a new information track can be recognized.

When both the regions 202 and 205 are used to discriminate the new information track, any information track can precisely be separated and distinguished from the other information tracks even if the information track is out of parallel to the one-dimensional sensor array.

Since the discrimination region is formed by two or more bits, error due to dirt, scratches or others the like can be minimized. In the embodiment of FIG. 4, the discrimination region is formed by two bits.

Figure 8:
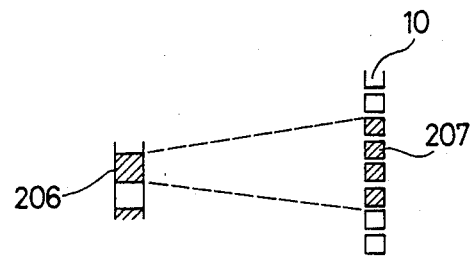
FIG. 8 illustrates the relationship between the sensor array and the recording region of the optical card.

A process of reproducing the above information recording carrier will be described below. This process utilizes the reproducing apparatus shown in FIG. 2 to read information from an optical card which is in the form of the information recording carrier having the recording format shown in FIG. 4. Further, the reproducing apparatus has an optical magnification selected so that one bit 206 on the recording region of the optical card can be imaged onto the one-dimensional sensor array 10 through four cells 207, as shown in FIG. 8. For example, if the magnitude of one bit 206 on the optical card is equal to 10 $\mu$m and the size of a cell 207 on the one-dimensional sensor array 10 is equal to 15 $\mu$m, the optical imaging system 9 may have a magnification equal to $4 \times 15/10 = 6$.

Figure 9:
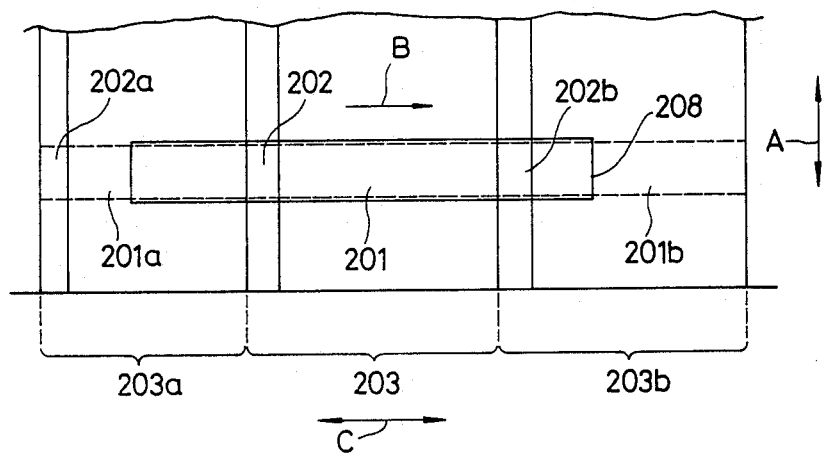
FIG. 9 illustrates a reproduction in the first embodiment of the present invention.

FIG. 9 illustrates a process of reproducing the information recording carrier constructed according to the present invention.

As seen from FIG. 9, the recording area of the optical card is formed with a band 203, bands 203a and 203b adjacent to the opposite sides of the band 203, information tracks 201, 201a and 201b for the respective bands and separating regions 202, 202a and 202b each for separating each of the information track from the other information tracks, all of which regions are formed in accordance with the format shown in FIG. 4. A track in one band is formed herein by 88 bits which totally include 6 bits in the separating region, 80 bits in the information track and 2 bits in the discrimination region. As a result, the track in one band will be imaged on the sensor array 10 through 352 of cells 207.

The one-dimensional sensor array 10 used herein is in the form of a CCD having 512 of cells 207 and also including a readout region 203 formed such that parts of the information tracks 201a and 201b adjacent to the information track 201 to be read also can be imaged on the sensor array 10.

The provision of such a readout region 208 enables clocks to be fetched on reproducing without need of any preamble region for providing self-clocks to the information track to be read. For example, part of the information on the information track 201a can be used to fetch reproducing clocks when the sensor array 10 makes its scan in the direction of arrow B at the readout region 208. When the sensor array 10 detects the separating region 202, the fetched clocks initiate the reproduction of the information recorded on the information track 201. As the separating region 202b is detected by the sensor array 10, the reproduction is stopped.

A reproducing apparatus used to perform such a process of reproducing the information in the optical card according to the present invention will be described below.

Figure 10:
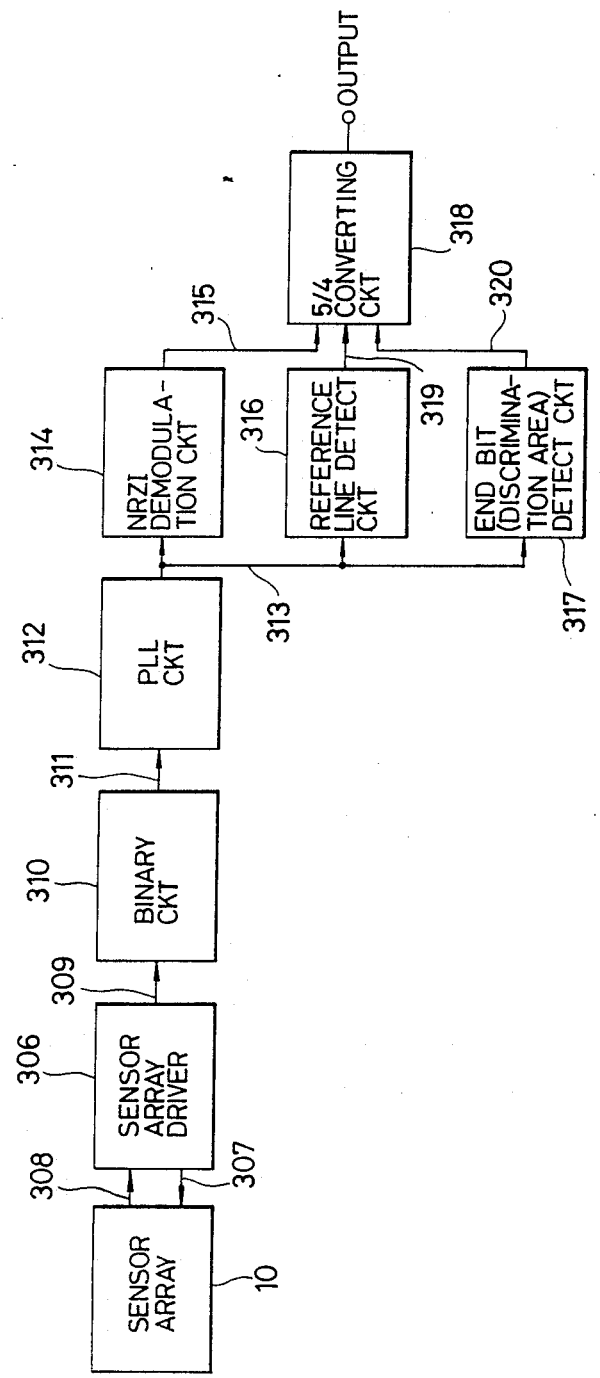
FIG. 10 is a block diagram of an optical card reproducing system in accordance with the reproduction shown in FIG. 9.

FIG. 10 is a block diagram of an optical card reproducing apparatus for performing the above-mentioned reproducing process.

In FIG. 10, the sensor array 10 having the readout region 208 is driven by drive clocks 307 from a sensor array driver 306. The output signal 308 from the sensor array 10 is amplified by the same driver 306, with the amplified signal being supplied to the input of a binarization, or binary circuit 310 as a video signal 309. The binary digitized video signal 311 is supplied from the binary circuit 310 to a PLL circuit 312 wherein a clock reproduction is made. The output 313 of PLL circuit 312 is divided into three sections, that is, data, reference line and end bit section, which in turn are applied to the inputs of NRZI demodulation circuit 314, reference line detecting circuit 316 and end bit detecting circuit 317, respectively. The data section is demodulated by the NRZI demodulation circuit 314 and then fed into a 5/4 converting circuit 318 through 315. At the same time, the reference line and end bit are detected such that the objective information track is separated and distinguished from the other information tracks. At this time, detection signals 319 and 320 are supplied to the 5/4 converting circuit 318. If both the detection signals 319 and 320 are simultaneously provided to the converting circuit 318, the signal 315 from the NRZI demodulation circuit 314 is converted by the 5/4 converting circuit 318 into a reproducing output signal indicative of the information in the objective information track.

Since the intervals of inversion in signals are T, 2T and 3T as described, the R-line is detected when the interval 4T represented by "011110" appears. After signals other than that represented by "011110" have been detected, and when the signal "011110" is again detected, this means that the sensor array is shifted to a new track. When the end bit is detected, "01" changes to "10" or vice versa. This also means that the sensor array is shifted to the new track. If the conditions of detection for R-line and end bit are stored, the use of both the R-line and end bit detections can discriminate the next track to be read without any error during reproducing and reading, even if the line sensor is out of parallel to the track.

Although the embodiment of FIG. 10 has used the 4/5 NRZI modulation system, the present invention can similarly be applied to a self-clockable modulation system required to have a region for obtaining information reproducing clocks in MFM, EFM and other modulation systems or any modulation system other than the self-clockable modulation system.

It is also apparent that the adjacent regions used to fetch reproducing clocks may be the entirety of an information track adjacent to the information track being read or may extend through a plurality of bands.

The present invention can be applied to an optomagnetic recording carrier in which the direction of magnetization can be inverted or a recording carrier including concavo-convex bits.

As described hereinbefore, the information recording carrier constructed according to the present invention can prevent errors on reproducing and readingout since each of the information tracks can positively be discriminated in the information recording carrier.

Figure 11:
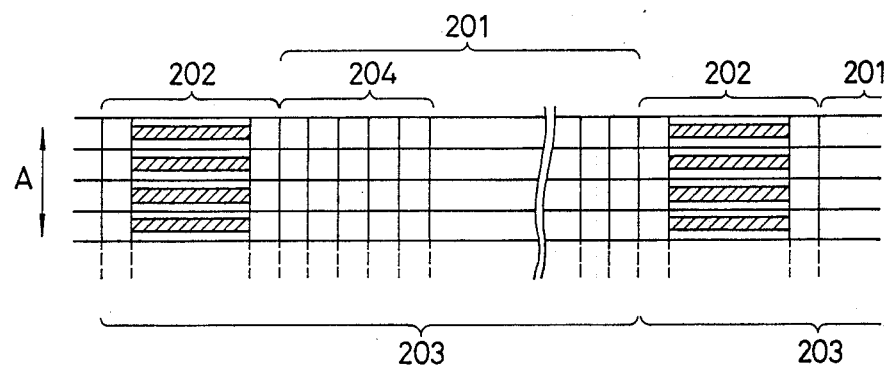
FIG. 11 is a diagrammatic view showing a recording format in another embodiment of an information recording carrier according to the present invention.

FIG. 11 is a diagrammatic view showing a recording format in another embodiment of an information recording carrier constructed according to the present inventron.

In FIG. 11, an information track 201 is separated from adjacent information tracks 201 by separating regions 202 in the direction of bit arrangement. A plurality of tracks each consisting of one information track 201 and one separating region 202 define a band 203. A plurality of bands 203 are arranged with each line of separating regions 202 in the bands 203 defining an R-line separating adjacent information tracks from each other.

Each of unit data regions 204 is formed by five bits. Data to be stored are subjected to 4/5 conversion in accordance with the aforementioned conversion rules and then NRZI modulation before they are recorded (see FIG. 5).

Information in each of R-lines is recorded with a length smaller than the track width of the other data regions. Ratio of the track width of the data region to the information record width of the R-line is selected to be equal to about 1:½.

Figure 1:
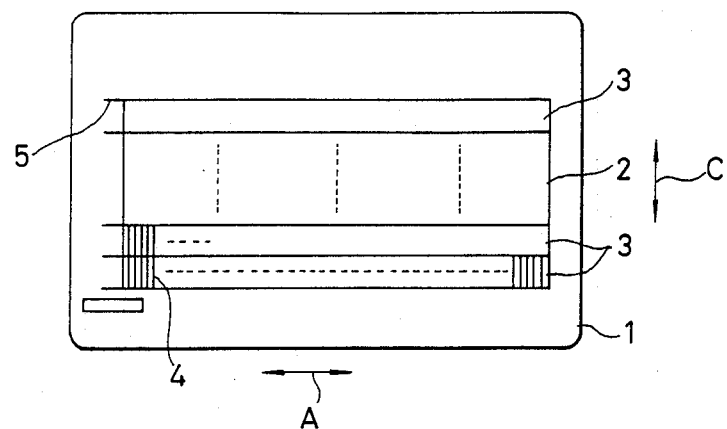
FIG. 1 is a diagrammatic plan view showing a recording format on an optical card.

In the embodiment of FIG. 11, each of the separating regions 202 is similarly in the form of a region having an interval of inversion equal to 4T. As shown in FIG. 1, for example, a separating signal "011110" is previously recorded in the direction of read-out or arrangement on the information track. It is of course that the present invention is not limited to such an arrangement and may similarly be applied to other arrangement as long as the separating signal can be discriminated on reading.

Each of the information tracks 201 has 16 of unit data regions 204 and therefore formed totally by 80 bits. There is no preamble region for obtaining self-clocks on reproducing.

Since each of the separating regions 202 thus includes a continuous and identical code which does not appear in the information tracks 201, the detection of R-line can positively be made. Furthermore, more data can be stored in the information recording carrier since there is no preamble region for fetching clocks used to reproduce information and since the number of necessary bits other than data is reduced.

Figure 12:
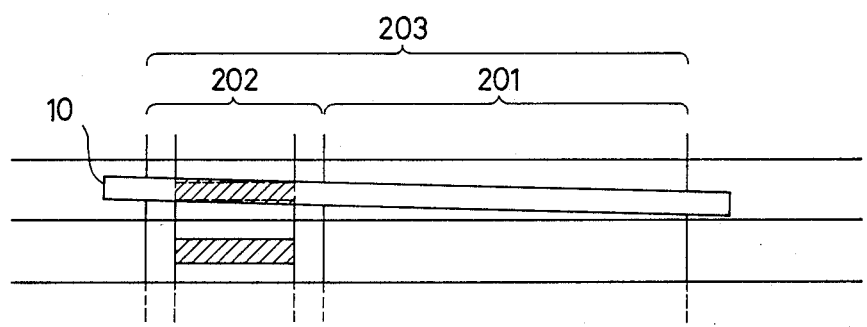
FIG. 12 illustrates the relationship between a track having a reference line and the one-dimensional sensor array in the second-mentioned embodiment of the present invention.

The information record width of the R-line is smaller than the width of the information track except the R-line. It is therefore assured that the entirety of the one-dimensional sensor array 10 is on the same and one information track when the R-line 202 is perfectly read out on the one-dimensional sensor array 10 even though the readout region of the one-dimensional sensor array 10 is out of parallel to the information track 201 as shown in FIG. 12. When the information recording width of the R-line is equal to the width of the information track except the R-line, and even if the R-line is perfectly read out as shown in FIG. 7, the accuracy of readout for the same and one information track can be reduced since the right-hand end of the one-dimensional sensor array 10 may be reading an information line different from the read R-line 202.

If the information record width of the R-line is smaller than the width of the information track, a new information track can be discriminated from the old information track by the fact that the information of the R-line is inverted on each shift to the new information track.

A process of reproducing the above information recording carrier will be described below. This process utilizes the reproducing apparatus shown in FIG. 2 to read information from an optical card which is in the form of the information recording carrier having the recording format shown in FIG. 11. Further, the reproducing apparatus has an optical magnification selected so that one bit 206 on the recording region of the optical card can be imaged onto the one-dimensional sensor array 10 through four cells 207, as shown in FIG. 8. For example, if the magnitude of one bit 206 on the optical card is equal to 10 μm and the size of a cell 207 on the one-dimensional sensor array 10 is equal to 15 μm, the optical imaging system 9 may have a magnification equal to $4 \times 15/10 = 6$.

A process of reproducing the information recording carrier constructed according to the present embodiment will be described below.

As in the embodiment of FIG. 9, the recording area of the optical card is formed with a band 203, bands 203a and 203b adjacent to the opposite sides of the band 203, information tracks 201, 201a and 201b for the respective bands and separating regions 202, 202a and 202b each for separating each of the information track from the other information tracks all of which regions are formed in accordance with the format shown in FIG. 4. A track in one band is formed herein by 86 bits which totally include 6 bits in the separating region and 80 bits in the information track. As a result, the track in one band will be imaged on the sensor array 10 through 344 of cells 207.

The one-dimensional sensor array 10 used herein is in the form of a CCD having 512 of cells 207 and also including a readout region 203 formed such that parts of the information tracks 201a and 201b adjacent to the information track 201 to be read also can be imaged on the sensor array 10.

The provision of such a readout region 208 enables clocks to b fetched on reproducing without need of any preamble region for providing self-clocks to the information track to be read. For example, part of the information on the information track 201a can be used to fetch reproducing clocks when the sensor array 10 makes its scan in the direction of arrow B at the readout region 208. When the sensor array 10 detects the separating region 202, the fetched clocks initiates the reproduction of the information recorded on the information track 201. As the separating region 202b is detected by the sensor array 10, the reproduction is stopped.

A reproducing apparatus used to perform such a process of reproducing the information in the optical card according to the present invention will be described below.

Figure 13:
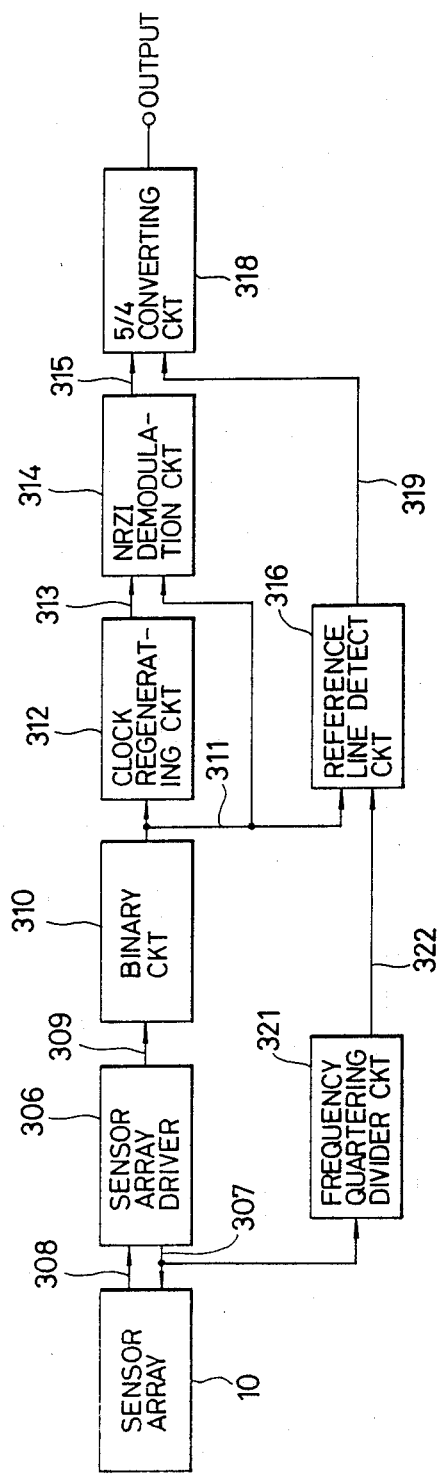
FIG. 13 is a block diagram of an optical card reproducing system in accordance with the reproduction in the information recording carrier shown in FIG. 11.

FIG. 13 is a block diagram of an optical card reproducing apparatus for performing the above-mentioned reproducing process.

In FIG. 13, the sensor array 10 having the readout region 208 is driven by drive clocks 307 from a sensor array driver 306. The output signal 308 from the sensor array 10 is amplified by the same driver 306 with the amplified signal being supplied to the input of a binary circuit 310 as a video signal 309. The binary-digitized video signal 311 is supplied as NRZI signal 311 to a clock reproducing circuit 312, an NRZI demodulation circuit 314 and an R-line detecting circuit 316, respectively.

At the clock regenerating circuit 312, NRZI signal 311 is separated into a clock signal 313 which in turn is applied to the output of the NRZI demodulation circuit 314. When the NRZI demodulation circuit 314 receives the clock signal 313 and the NRZI signal 311, it generates an NRZ signal 315 as a demodulated signal which in turn is supplied to the input of 5/4 conversion circuit 318. On the other hand, the R-line detecting circuit 316 receives a clock signal 322 divided from a drive clock 307 by a frequency quartering or ¼ division circuit 321 and NRZI signal 311 from the binary circuit 310. The R-line detecting circuit 316 then generates an R-line detection signal 319 which in turn is applied to the input of the 5/4 conversion circuit 318. As a result, the 5/4 conversion circuit 318 causes NRZ signal 315 to be subjected to 5/4 conversion.

Figure 14:
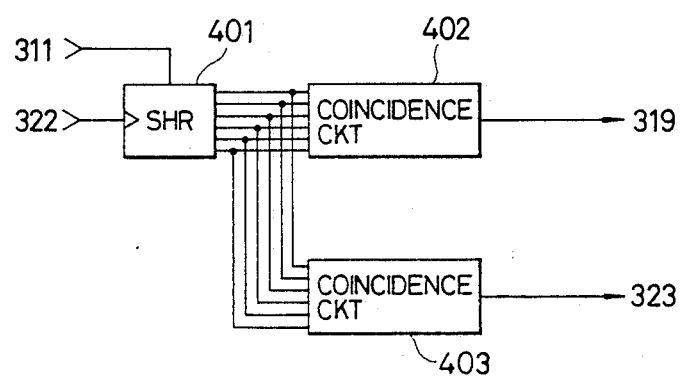
FIG. 14 is a block diagram of a reference line detecting circuit.

FIG. 14 is a block diagram of the aforementioned R-line detecting circuit 316. In this figure, a shift register 401 includes a series input terminal receiving NRZI signal 311 and a clock input terminal receiving a frequency quartered clock signal 322. The shift register 401 also includes 6-bit parallel output terminals connected with the respective input terminals of a coincidence circuit 402. A coincidence signal from the coincidence circuit 402 is supplied as an R-line detection signal 319 to the 5/4 conversion circuit 318.

The operation of the reproducing apparatus will now be described with reference to FIG. 9 and FIGS. 11 to 14.

When the sensor array 10 is moved by drive clocks 307 in the direction shown by arrow B in FIG. 9 to scan the readout region 208, NRZI signal 311 first becomes a readout signal for part of the information on the adjacent information track 201a. Since this readout signal has only intervals of inversion equal to T, 2T and 3T as described hereinbefore, a fetched clock signal 313 having the minimum interval of inversion T can be regenerated by the clock regenerating circuit 312 which utilizes PLL circuit and others. This clock signal 313 causes the NRZI signal 311 to demodulate into NRZ signal 315 in the demodulation circuit 314. However, the 5/4 conversion circuit 318 will not operate unless the first R-line detection signal 319 is provided to it. In other words, bit signals in the readout region 208 are sequentially inputted to the shift register 401 in the R-line detecting circuit 316 so that the shift register 401 is filled with signals of six bits at all times. Therefore, the R-line detection signal 319 will not be generated unless the contents stored in the shift register 401 is coincident with the contents recorded in the separating region 202 or 202b, that is, "011110".

When 6-bit information is stored from the first separating region 202 to the shift register 401, the coincidence circuit 402 generates at its output an R-line detection signal 319 which in turn initiates the conversion in the 5/4 conversion circuit 318. Thus, NRZI signal 315 corresponding to the information in the information track 201 to be read is subjected to 5/4 conversion into a reproducing output signal.

When the information in the next separating region 202b is stored in the shift register 410, an R-line detection signal 319 is generated at the output of the coincidence circuit 402 and used to stop the generation of a reproducing output signal in the 5/4 conversion circuit 318.

In such a manner, the regeneration of the information in the information track to be read is executed by selfclocking. Subsequently, as in FIG. 2, the optical card is moved in the direction of arrow A or the optical head 11 on which the sensor array 10 is mounted is moved in the direction of arrow C. Thus, the desired information track is selected and read out with its information being reproduced.

The scanning of the sensor array 10 is not synchronized with the relative movement between the optical card and the sensor array 10. Therefore, depending on the selection of the scanning speed of the moving sensor array 10 in the direction of arrow B and the velocity of the optical card in the direction of arrow A or C, one information track may be scanned through a plurality of times. For example, where a sensor array 10 including 512 of cells is driven by the use of clocks 307 having a frequency F equal to 10 MHz; the velocity of movement in the optical card is equal to 40 mm/sec.; and the size L of one bit in the optical card is equal to 10 $\mu$m, the number of scannings per information track S is:

$$S = L/V \times 1/(1/F \times 512) = 4.88.$$

Therefore, it is required to detect that the optical card has been shifted to the next information track.

When the coincidence circuit 403 detects 6-bit information ("000000"), its output generates an coincidence signal 323. Therefore, by obtaining the R-line detecting signal 319 after the coincidence signal 323 from the coincidence circuit 403 has been detected, it is recognized that the optical card has been shifted to a new track.

Although the present embodiment has been described as to the 4/5 and NRZI modulation system, the present invention may be applied to a self-clockable modulation system wherein there is required a region used to obtain information reproducing clocks of MFM, EFM and other modulation systems or various other modulating systems.

Any adjacent region used to fetch reproducing clocks may be the entirety of the adjacent information track or a region extending through a plurality of bands.

The present invention may similarly be applied to an optomagnetic record carrier wherein the direction of magnetization can be inverted or a recording carrier having concavo-convex bits.

As will be apparent from the foregoing, the information recording carrier constructed in accordance with the present embodiment can provide an increased data storing capacity since a spacing between each adjacent information tracks in the direction of information arrangement can effectively be utilized.

Moreover, errors on reproducing and reading can be prevented since each of the information tracks can positively be discriminated from the other information tracks.

Figure 2:
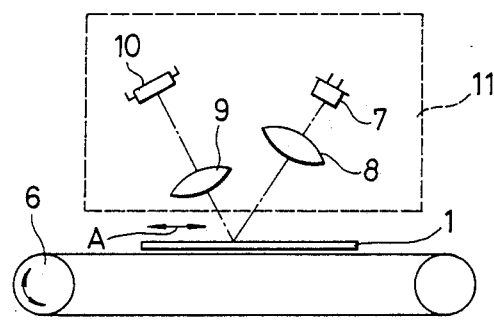
FIG. 2 is a schematic diagram of an optical card reproducing apparatus.
Figure 17:
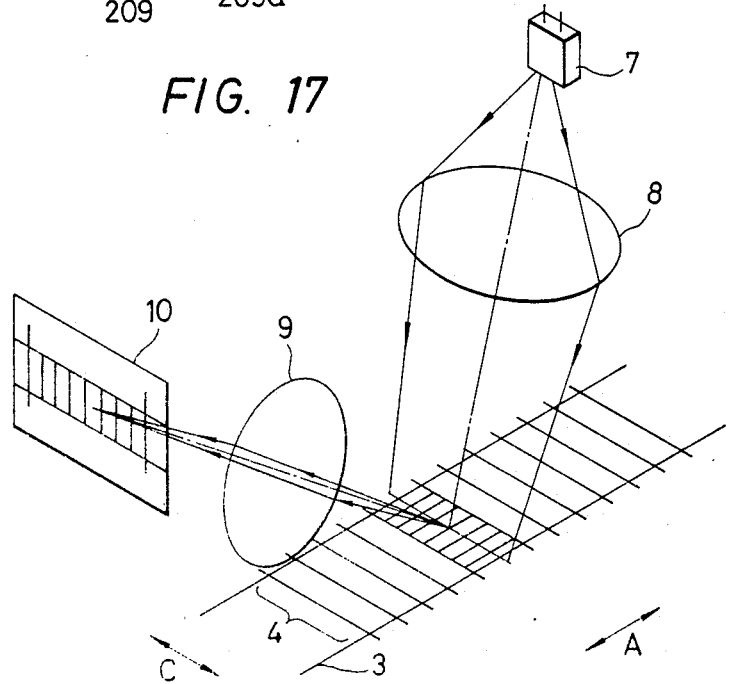
FIG. 17 illustrates the reading operation of a reading head portion used to reproduce the information on a track.

Referring now to FIG. 17, there is shown the concrete readout operation of the readout head in the reproducing apparatus shown in FIG. 2. The optical card 1 can be moved in the direction of arrow A by the rotating mechanism 6. Information recorded on the optical card 1 can be read and reproduced by the optical head 11 for each information track. Rays from the source of light 7 such as LED or the like are condensed by the lens system 8 into a condensed beam which in turn illuminates an information track 4 to be read. The illuminated information track 4 is then imaged onto the sensor array 10 through the optical imaging system 9. Thus, the sensor array 10 generates electrical output signals corresponding to the information recorded on that information track 4. On termination of the readout of the information track 4, the optical card 1 is moved in the direction of arrow A, or the optical head 11 is moved in the direction in which the bands 3 are arranged, that is, in the direction of arrow C to a position at which the next information track can be read out in the same manner.

The sensor array 10 may be either of CCD type or MOS type. With the CCD type sensor array used, charges accumulated in the respective sensor cells of the array are simultaneously read out by an amount corresponding to one information track within a predetermined period of exposure. On the contrary, the MOS type sensor array performs its read out operation by sequentially line-scanning the sensor cells corresponding to one information track within a predetermined period of scan.

A region on the optical card actually subjected to one readout operation is determined by the velocity of the moving card and the exposure period in the CCD type sensor array or the velocity of the moving card and the scan period in the MOS type sensor array.

FIG. 18A illustrates a region of the optical card being read out by the CCD type sensor array while FIG. 18B shows a region of the optical card being read out by the MOS type sensor array.

In FIG. 18A, information on the optical card corresponding to one information track is read out at a time by the CCD type sensor array. If the orientation of bit arrangement on the information track of the optical card is parallel to the orientation of cell arrangement on the sensor array, the region being read out (hatched section) will be parallel to the orientation of bit arrangement on the information track. As a result, the width of the region being read out will be determined by the velocity of the moving card and the exposure period of the CCD type sensor array.

In FIG. 18B, information on the optical card corresponding to one information track is sequentially read out by the MOS type sensor array for each sensor cell. Even if the orientation of bit arrangement on the information track is parallel to the orientation of cell arrangement on the sensor array, the region being read out (hatched section) will not be parallel to the orientation of bit arrangement on the information track and will be inclined thereto at an angle $\theta$. The angle $\theta$ and the width e of the region being read out are determined by the velocity of the moving card and the scan period of the MOS type sensor array.

Apparently, as in the MOS type sensor array, there is a departure from the parallelism due to the selected kind of the sensor system in addition to the out-of-parallel relationship between the orientation of bit arrangement on the information track and the orientation of cell arrangement on the sensor array due to the scatters in manufacturing information recording carriers the conditions of the information recording carriers being used and so on. Therefore, the present invention further provides a modified embodiment of the information recording carrier which even in the above case, each of the information tracks can positively be discriminated from the other information tracks to reproduce the information in an accurate manner.

Figure 15:
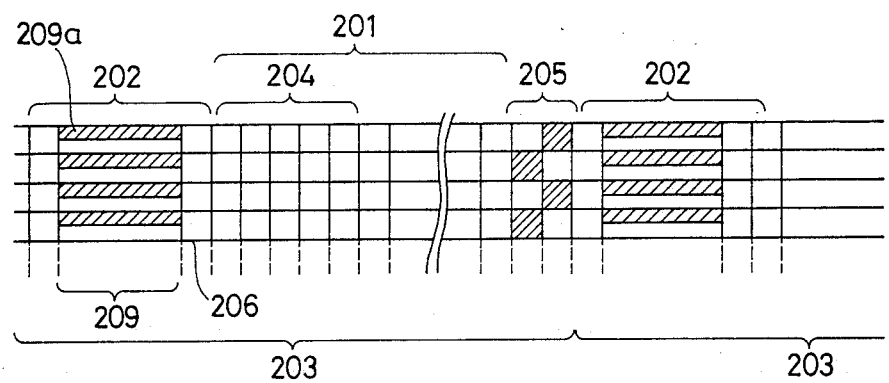
FIG. 15 is a diagrammatic view showing a recording format in still another embodiment of an information recording carrier according to the present invention.

FIG. 15 is a diagrammatic view showing a recording format in a further embodiment of the information recording carrier according to the present invention.

Figure 16:
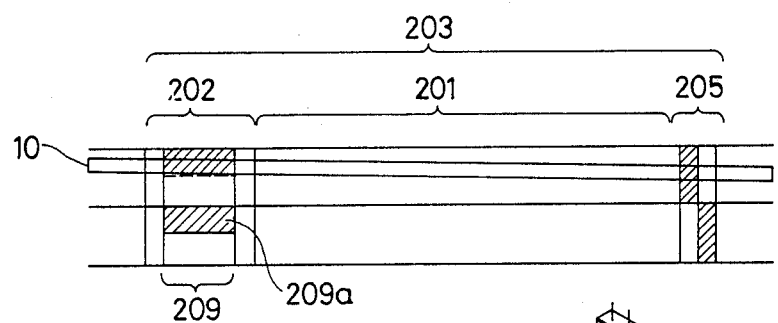
FIG. 16 illustrates the relationship between a track having a reference line and the sensor array in the embodiment of the present invention shown in FIG. 15.

FIG. 16 illustrates the relationship between a track having a reference line according to the present invention and the sensor array.

Referring to FIGS. 15 and 16, an information track 201 is separated from adjacent information tracks by separating regions 202 in the direction of bit arrangement. A discrimination region 205 is provided between the information track 201 and the separating region 202. The discrimination region 205 also functions as an end bit of the corresponding information track 201. By the presence of the discrimination region 205, the information track can be separated and distinguished from adjacent information tracks in the direction substantially perpendicular to the direction of bit arrangement.

A band 203 is formed by a plurality of arranged tracks each of which consists of an information track 201, a separating region 202 and a discrimination region 205. A plurality of such bands 203 is arranged with the line of the separating regions 202 in the bands 203 separating adjacent information tracks from each other.

The information track 201 includes unit data regions 204 each of which is formed by five bits. Data stored in each of the unit data regions 204 are subjected to a 4/5 modulation in accordance with a conversion rule shown in the aforementioned table and then to an NRZI modulation before they are recorded.

Also in the present embodiment, a region having a interval of inversion equal to 4T is used as a separating region 202 for separating an information track from an adjacent track. For example, as shown in FIG. 5, a separation signal "100001" is previously recorded in the direction of reading or arrangement for information tracks. It is a matter of course that the present invention is not limited to such an arrangement and can similarly be applied to any arrangement as long as the read information can be distinguished from others.

Figure 3:
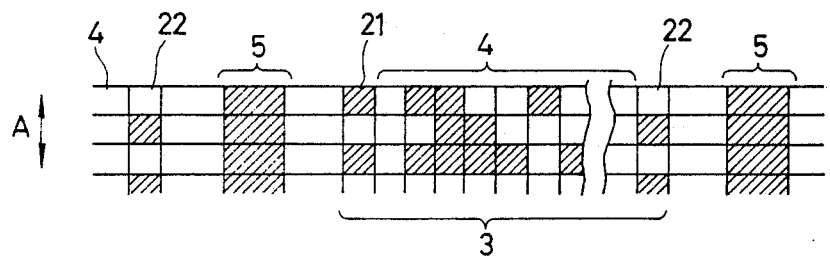
FIG. 3 is a diagrammatically enlarged view showing part of the conventional recording format.

The 4/5 and NRZI modulation system according to the present embodiment can more accurately discriminate the R-lines and information tracks in comparison with the case as the information "001100" of the separating region shown in FIG. 3 is used since the information "001100" of the separating region used to detect the R-line may similarly be included in the information track.

Each of the information tracks 201 includes 16 of unit data regions 204 with the total number of bits being equal to 80. In the present embodiment, there is no preamble region for obtaining self-clocks on reproducing. However, a preamble region may be provided in the present embodiment.

In this manner, the R-line 209 can positively be detected since any separation region 202 includes a continuous and identical code which will not appear in the corresponding information track 201.

Furthermore, by forming the information record section 209a (hatched portion) of each of the R-lines 209 with the width thereof substantially perpendicular to the direction of bit arrangement in the corresponding information track being smaller than the width of the information track except that R-line 209, it is assured that the entire sensor array 10 is on the same information track when the R-line 209 is perfectly read out on the sensor array 10 and even if the information track 201 is out of parallel to the readout region of the sensor array 10 as shown in FIG. 16.

With the MOS type sensor array used, an actually read region is inclined to the information track with an angle as shown in FIG. 18B. Therefore, the entire sensor array can more positively be located relative to the same and one information track by disposing each of the R-lines 209 having its information record section 209a reduced in width nearer one side of the information track in the direction of information arrangement as shown in FIG. 15.

The width of the information record section 209a in the aforementioned R-line 209 is determined from various factors such as the angle of the readout region relative to the information track in the direction of bit arrangement, the readout cycle of the sensor array, the velocity of the moving card, the size of each of the sensor cells in the sensor array, the magnification of the optical readout system, the length of the information track in the direction of bit arrangement, the length of the R-line in the direction of bit arrangement on the information track and so on.

If the length of the information track 201 in the direction of bit arrangement is substantially equal to or smaller than the length of the R-line 209 in the direction of bit arrangement on the information track, the width of the information record section 209a in the R-line is less required to be reduced since an acceptable range relative to the out-of-parallelism of the information track 201 from the readout region of the sensor array 10 is increased. However, since the length of the information track 201 in the direction of bit arrangement is normally increased sufficiently relative to the length of the R-line 209 in the direction of bit arrangement on the information track, the information recording carrier according the present invention is useful and effective. In the embodiment of FIG. 15, ratio of the width of an information track to the width of the information record section 209a in an R-line 209a is established to be about 1:2. If the width of the information record section 209a in the R-line 209 is equal to that of the information track except the R-line, the accuracy of readout can be reduced relative to the same and one information track since the righthand end of the sensor array 10 may be reading any information line other than the R-line 209 to be read even if that R-line is perfectly be read out as previously shown in FIG. 7.

If the information record width of the R-line is smaller than the width of the information track, a new information track can be discriminated from the old information track by the fact that the information of the R-line is inverted on each shift to the new information track.

The discrimination region 205 is formed by two or more bits with a modified bit pattern between each adjacent tracks. Thus, the discrimination region 205 serves as an end bit and will have its changed information as each of new information tracks is selected. Thus, the selection of a new information track can be recognized.

When both the separating and discriminating regions 202 and 205 are used to discriminate the new information track, any information track can precisely be separated and distinguished from the other information tracks even if the information track is out of parallel to the one-dimensional sensor array.

Since the discrimination region is formed by two or more bits, error due to dirt, scratches or the like can be minimized. In the embodiment of FIG. 4, the discrimination region 205 is formed by two bits.

A process of reproducing the above information recording carrier will be described below. This process utilizes a reproducing apparatus shown in FIG. 2 to read information from an optical card which is in the form of the information recording carrier having the recording format shown in FIG. 15. Further, the reproducing apparatus has an optical magnification selected so that one bit 206 on the recording region of the optical card can be imaged onto the one-dimensional sensor array 10 through four cells 207, as shown in FIG. 8. For example, if the magnitude of one bit 206 on the optical card is equal to 10 $\mu$m and the size of a cell 207 on the one-dimensional sensor array 10 is equal to 15 $\mu$m, the optical imaging system 9 may have a magnification equal to $4 \times 15/10 = 6$.

FIG. 9 also is used therein for illustrating a process of reproducing the information recording carrier just mentioned above.

As seen from FIG. 9, the recording area of the optical card is formed with a band 203, bands 203a and 203b adjacent to the opposite sides of the band 203, information tracks 201, 201a and 201b for the respective bands and separating regions 202, 202a and 202b each for separating each of the information track from the other information tracks, all of which regions are formed in accordance with the format shown in FIG. 1. A track in one band is formed herein by 88 bits which totally include 6 bits in the separating region, 80 bits in the information track and 2 bits in the discrimination region. As a result, the track in one band will be imaged on the sensor array 10 through 352 of cells 207.

The one-dimensional sensor array 10 used herein is in the form of a CCD having 512 of cells 207 and also including a readout region 203 formed such that parts of the information tracks 201a and 201b adjacent to the information track 201 to be read also can be imaged on the sensor array 10.

The provision of such a readout region 208 enables clocks to be fetched on reproducing without need of any preamble region for providing self-clocks to the information track to be read. For example, part of the information on the information track 201a can be used to fetch reproducing clocks when the sensor array 10 makes its scan in the direction of arrow B at the readout region 208. When the sensor array 10 detects the separating region 202, the fetched clocks initiates the reproduction of the information recorded on the information track 201. As the separating region 202b is detected by the sensor array 10, the reproduction is stopped.

An apparatus for reproducing the information on the information recording carrier according the just aforementioned embodiment of the present invention may be in the form of the apparatus shown in FIG. 10, for example.

In FIG. 10, the sensor array 10 having the readout region 208 is driven by drive clocks 307 from a sensor array driver 306. The output signal 308 from the sensor array 10 is amplified by the same driver 306 with the amplified signal being supplied to the input of a binary circuit 310 as a video signal 309. The binary digitized video signal 311 is supplied from the binary circuit 310 to a PLL circuit 312 wherein a clock reproduction is made. The output 313 of PLL circuit 312 is divided into three sections, that is, data, reference line and end bit sections which in turn are applied to the inputs of NRZI demodulation circuit 314, reference line detecting circuit 316 and end bit detecting circuit 317, respectively. The data section is demodulated by the NRZI demodulation circuit 314 and then fed into a 5/4 converting circuit 318 through 315. At the same time, reference line and end bit are detected such that the objective information track is separated and distinguished from the other information tracks. At this time, detection signals 319 and 320 are supplied to the 5/4 converting circuit 318. If both the detection signals 319 and 320 are simultaneously provided to the converting circuit 318, the signal 315 from the NRZI demodulation circuit 314 is converted by the 5/4 converting circuit 318 into a reproducing output signal indicative of the information in the objective information track.

Since the intervals of inversion in signals are T, 2T and 3T as described, R-line can be detected when the interval 4T represented by "011110" appears. After signals other than that represented by "011110" have been detected and when the signal "011110" is again detected, this means that the sensor array is shifted to a new track. When the end bit is detected, "01" changes to "10" or vice versa. This also means that the sensor array is shifted to the new track. If the conditions of detection for R-line and end bit are stored, the use of both the R-line and end bit detections can discriminate the next track to be read without any error on reproducing and reading even if the line sensor is out of parallel to the track.

Although the embodiment of FIG. 10 has used the 4/5 NRZI modulation system, the present invention can similarly be applied to any self-clockable modulation system required to have a region for obtaining information reproducing clocks in MFM, EFM and other modulation systems.

It is also apparent that the adjacent regions used to fetch reproducing clocks may be the entirety of an information track adjacent to the information track being read or may extend through a plurality of bands.

The present invention can be applied to an optomagnetic recording carrier in which the direction of magnetization can be inverted or a recording carrier including concavo-convex bits.

As described hereinbefore, the information recording carrier constructed according to the present invention can prevent errors on reproducing and reading-out since each of the information tracks can positively be discriminated in the information recording carrier. This is useful and effective particularly for such a sensor array that the readout region is out of parallel to the information track in the direction of bit arrangement, such as MOS type sensor array.

Figure 19:
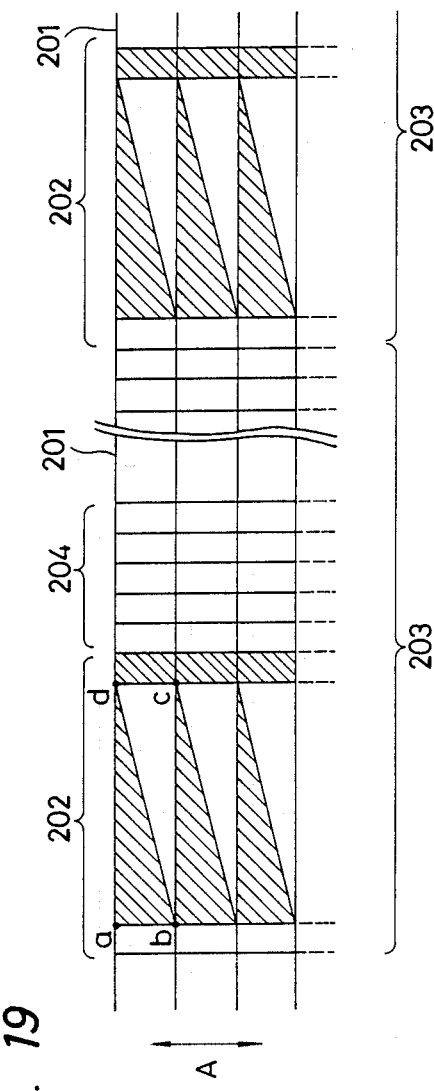
FIG. 19 is a diagrammatic view showing a recording format in a further embodiment of an information recording carrier according to the present invention.

FIG. 19 is a diagrammatic view showing a recording format in a further embodiment of an information recording carrier constructed according to the present invention.

In FIG. 19, an information track 201 is separated from adjacent information tracks 201 by separating regions 202 in the direction of bit arrangement. A plurality of tracks each consisting of one information track 201 and one separating region 202 define a band 203. A plurality of bands 203 are arranged with each line of separating regions 202 in the bands 203 defining an R-line separating adjacent information tracks from each other.

Each of unit data regions 204 is formed by five bits. Data to be stored are subjected to 4/5 conversion in accordance with the aforementioned conversion rules and then NRZI modulation before they are recorded.

Information of each of the R-lines is formed by ten bits starting with "0" and terminating with "1", each of the eight middle bits being in the form of a rectangular-shaped configuration abcd divided by a diagonal line bd into two triangles abd and bcd which are different in information from each other. As seen from FIG. 19, for example, one of the triangles bcd is defined to have its information "0" when the other triangle abd has its information "1". Furthermore, the diagonal line may be stepped rather than a straight line.

Also in the present embodiment, a region having an interval of inversion equal to 4T is used as a separating region 202 for separating an information track from an adjacent track. For example, as shown in FIG. 19, a separation signal "011140" is previously recorded in the direction of reading or arrangement for information tracks. It is of course that the present invention is not limited to such an arrangement and can similarly be applied to any arrangement as long as the read information can be distinguished from others. Each of the information track 201 has 16 of unit data regions 204 with the total number of bits used to form that information track being equal to 80. There is no preamble region for obtaining self-clocks used on reproducing.

In such a manner, each of R-lines 202 can positively be detected since each of the separating regions 202 includes a continuous and identical code which will not appear in the information tracks 201. Moreover, more data can be stored in the carrier since it does not have any preamble region for fetching information reproducing clocks and since the number of necessary bits other than the data is reduced.

Figure 20:
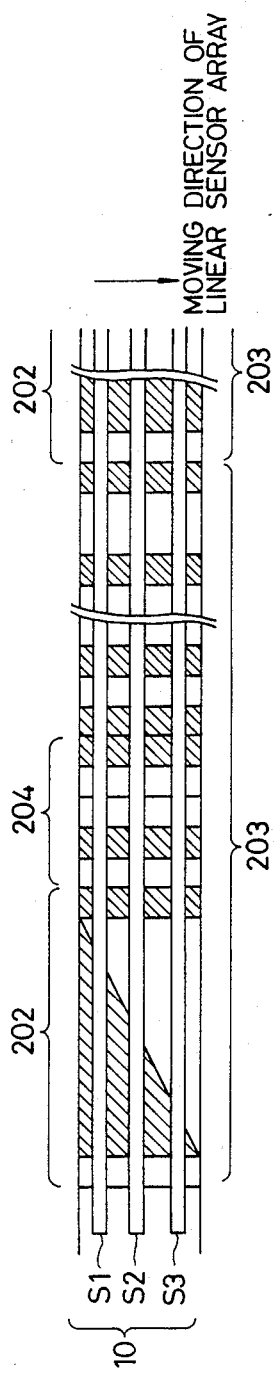
FIG. 20 illustrates the relationship between a track having a reference line and the one-dimensional sensor array in the embodiment of the present invention shown in FIG. 19.
Figure 21:
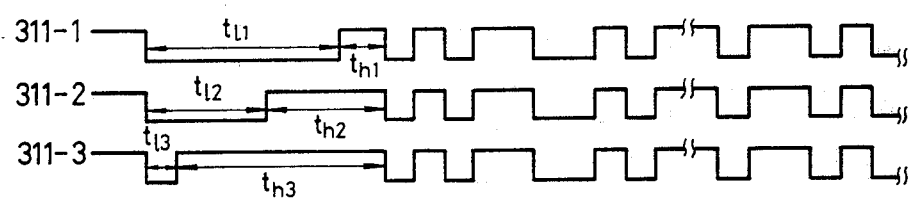
FIG. 21 illustrates binary digitized waveforms in the output of the one-dimensional sensor array shown in FIG. 20

FIG. 21 shows waveforms obtained by binary digitizing the output signals of the one-dimensional sensor array at the binary circuit when in the information record configuration of the R-line as shown in FIG. 19, the one-dimensional sensor array is moved on the information track following a path S1—S2—S3 as shown in FIG. 20. Where the binary signal outputs due to information "1" and "0" are respectively $t_l$ and $t_h$, signals corresponding to the positions S1, S2 and S3 of the one-dimensional sensor array 10 become 311-1, 311-2 and 311-3, respectively. The length of each of the binary signal outputs is changed as $t_{l1} > t_{l2} > t_{l3}$ and $t_{h1} < t_{h2} < t_{h3}$, respectively. When $t_1$ is equal to $t_h$, therefore, the one-dimensional sensor array is positioned at the center of the track. Thus, when the outputs $t_1$ and $t_h$ of the one-dimensional sensor array 10 are monitored by the use of R-lines, the center of the track can accurately be detected.

Figure 22:
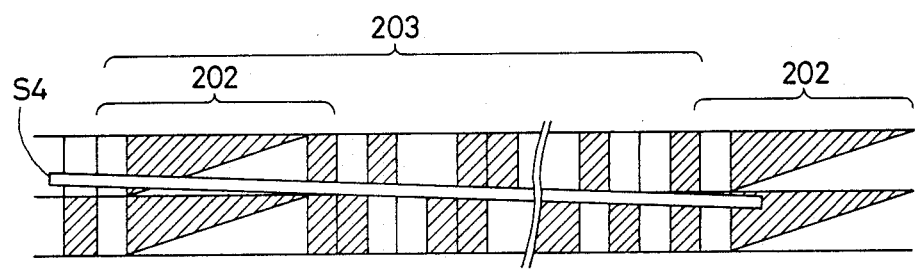
FIG. 22 illustrates the relationship between information tracks and the one-dimensional sensor array when the information tracks are not located parallel to the one-dimensional sensor array in the embodiment of the present invention shown in FIG. 19.

Particularly if the one-dimensional sensor array 10 is out of parallel to the track 4 as shown in FIG. 22 and when the one-dimensional sensor array 10 reaches a position S4, the right-hand end of the one-dimensional sensor array 10 may be reading the information of the track different from an R-line 202 which has completely been read out by the one-dimensional sensor array 10. This results in reduction of the accuracy in detection. It is therefore important that the one-dimensional sensor array 10 reads out information on the track particularly at its center A process of reproducing the above information recording carrier will be described below. This process utilizes a reproducing apparatus shown in FIG. 2 to read information from an optical card which is in the form of the information recording carrier having the recording format shown in FIG. 19. Further, the reproducing apparatus has an optical magnification selected so that one bit 206 on the recording region of the optical card can be imaged onto the one-dimensional sensor array 10 through four cells 207, as shown in FIG. 8. For example, if the magnitude of one bit 206 on the optical card is equal to 10 μm and the size of a cell 207 on the one-dimensional sensor array 10 is equal to 15 μm, the optical imaging system 9 may have a magnification equal to $4 \times 15/10 = 6$.

A process of reproducing the information recording carrier constructed according to the present embodiment will be described again with reference to FIG. 9.

As in the embodiment of FIG. 9, the recording area of the optical card is formed with a band 203, bands 203a and 203b adjacent to the opposite sides of the band 203, information tracks 201, 201a and 201b for the respective bands and separating regions 202, 202a and 202b each for separating each of the information track from the other information tracks, all of which regions are formed in accordance with the format shown in FIG. 1. A track in one band is formed herein by 90 bits which totally include 10 bits in the separating region and 80 bits in the information track. As a result, the track in one band will be imaged on the sensor array 10 through 360 of cells 207.

The one-dimensional sensor array 10 used herein is in the form of a CCD having 512 of cells 207 and also including a readout region 203 formed such that parts of the information tracks 201a and 201b adjacent to the information track 201 to be read also can be imaged on the sensor array 10.

The provision of such a readout region 208 enables clocks to be fetched on reproducing without need of any preamble region for providing self-clocks to the information track to be read. For example, part of the information on the information track 201a can be used to fetch reproducing clocks when the sensor array 10 makes its scan in the direction of arrow B at the readout region 208. When the sensor array 10 detects the separating region 202, the fetched clocks initiates the reproduction of the information recorded on the information track 201. As the separating region 202b is detected by the sensor array 10, the reproduction is stopped.

A reproducing apparatus used to perform the process of reproducing the information in such an information recording carrier may be in the form of such an apparatus as shown in FIG. 13.

FIG. 13 is a block diagram of an optical card reproducing apparatus for performing the above-mentioned reproducing process.

In FIG. 13, the sensor array 10 having the readout region 208 is driven by drive clocks 307 from a sensor array driver 306. The output signal 308 from the sensor array 10 is amplified by the same driver 306 with the amplified signal being supplied to the input of a binary circuit 310 as a video signal 309. The binary digitized video signal 311 is supplied as NRZI signal 311 to a clock reproducing circuit 312, an NRZI demodulation circuit 314 and an R-line detecting circuit 316, respectively.

At the clock regenerating circuit 312, NRZI signal 311 is separated into a clock signal 313 which in turn is applied to the output of the NRZI demodulation circuit 314. When the NRZI demodulation circuit 314 receives the clock signal 313 and the NRZI signal 311, it generates an NRZ signal 315 as a demodulated signal which in turn is supplied to the input of 5/4 conversion circuit 318. On the other hand, the R-line detecting circuit 316 receives a clock signal 322 divided from a drive clock 307 by a frequency quartering circuit 321 and NRZI signal 311 from the binary circuit 310. The R-line detecting circuit 316 then generates an R-line detection signal 319 which in turn is applied to the input of the 5/4 conversion circuit 318. As a result, the 5/4 conversion circuit 318 causes NRZ signal 315 to be subjected to 5/4 conversion.

Figure 23:
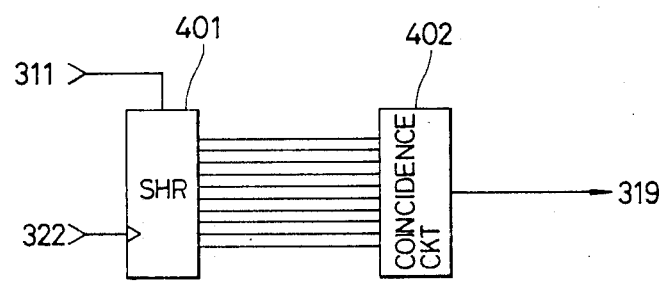
FIG. 23 is a block diagram showing an example of reference line detecting circuits.

FIG. 23 is a block diagram of the aforementioned R-line detecting circuit 316. In this figure, a shift register 401 includes a series input terminal receiving NRZI signal 311 and a clock input terminal receiving a frequency quartered clock signal 322. The shift register 401 also includes 10-bit parallel output terminals connected with the respective input terminals of a coincidence circuit of "0111100001". Coincidence signal from the coincidence circuit 402 is supplied as an R-line detection signal 319 to the 5/4 conversion circuit 318.

The operation of the reproducing apparatus will now be described with reference to FIGS. 9 and 13 and FIGS. 19 to 23.

When the sensor array 10 is moved by drive clocks 307 in the direction shown by arrow B to scan the readout region 208, NRZI signal 311 first becomes a readout signal for part of the information on the adjacent information track 201a. Since this readout signal has only intervals of inversion equal to T, 2T and 3T as described hereinbefore, a fetched clock signal 313 having the minimum interval of inversion T can be regenerated by the clock regenerating circuit 312 which utilizes PLL circuit and others. This clock signal 313 causes the NRZI signal 311 to demodulate into NRZ signal 315 in the demodulation circuit 314. However, the 5/4 conversion circuit 318 will not operate unless the first R-line detection signal 319 is provided to it. In other words, bit signals in the readout region 208 are sequentially inputted to the shift register 401 in the R-line detecting circuit 316 so that the shift register 401 is filled with signals of 10 bits at all times. Therefore, the R-line detection signal 319 will not be generated unless the content stored in the shift register 401 is coincident with the content recorded in the separating region 202 or 202b, that is, "0111100001".

When 10-bit information "011110000" is stored from the first separating region 202 to the shift register 401, the coincidence circuit 402 generates at its output an R-line detection signal 319 which in turn initiates the conversion in the 5/4 conversion circuit 318. Thus, NRZI signal 315 corresponding to the information in the information track 201 to be read is subjected to 5/4 conversion into a reproducing output signal.

When the information "0111100001" in the next separating region 202b is stored in the shift register 410, an R-line detection signal 319 is generated at the output of the coincidence circuit 402 and used to stop the generation of a reproducing output signal in the 5/4 conversion circuit 318.

In such a manner, the regeneration of the information in the information track to be read is executed by self-clocking. Subsequently, as in FIG. 2, the optical card is moved in the direction of arrow A or the optical head 11 on which the sensor array 10 is mounted is moved in the direction of arrow C. Thus, the desired information track is selected and read out with its information being reproduced.

The scanning of the sensor array 10 is not synchronized with the relative movement between the optical card and the sensor array 10. Therefore, depending on the selection of the scanning speed of the moving sensor array 10 in the direction of arrow B and the velocity of the optical card in the direction of arrow A or C, one information track may be scanned through a plurality of times. For example, where a sensor array 10 including 512 of cells is driven by the use of clocks 307 having a frequency F equal to 10 MHz; the velocity of movement in the optical card is equal to 40 mm/sec.; and the size L of one bit in the optical card is equal to 10 μm, the number of scannings per information track S is:

$$S = L/V \times 1/(1/F \times 512) = 4.88.$$

Therefore, it is required to detect that the optical card has been shifted to the next information track.

This can be accomplished by the fact that the 10-bit information "0111100001" of the separating region 202 is stored in the shift register 401 to stop the R-line detection signal 319 from the coincidence circuit 402.

Although the present embodiment has been described as to the 4/5 and NRZI modulation system, the present invention may be applied to any self-clockable modulation system wherein there is required a region used to obtain information reproducing clocks of MFM, EFM.

Any adjacent region used to fetch reproducing clocks may be the entirety of the adjacent information track or a region extending through a plurality of bands.

The present embodiment may similarly be applied to an optomagnetic record carrier wherein the direction of magnetization can be inverted or a recording carrier having concavo-convex bits.

As will be apparent from the foregoing, the information recording carrier constructed in accordance with the present embodiment can provide an increased data storing capacity since a spacing between each adjacent information tracks in the direction of information arrangement can effectively be utilized.

Moreover, errors on reproducing and reading can be prevented since each of the information tracks can positively be discriminated from the other information tracks.

What is claimed is:

1. An information recording medium comprising a plurality of information tracks on which information is recorded in accordance with a predetermined conversion system, said information tracks each including an information record section and being arranged in a first direction of information arrangement and in a second direction perpendicular to said first direction; and separating regions each formed between pairs of said information tracks adjacent to each other in said first direction, each of said separating regions including a record section which has at least a portion the width of which, in said second direction, is less than that of said information record section, and wherein the record section of each of said separating regions includes a continuous and identical code which is longer than any continuous and identical code which can appear in accordance with said predetermined conversion system.

2. An information recording medium according to claim 1, wherein the entire width, in said second direction, of the record section of each of said separating regions is less than that of said information record section.

3. An information recording medium according to claim 2, wherein the location of the record section of each of said separating regions is deviated, in said second direction, relative to one of said information tracks adjacent in said first direction.

4. An information recording medium according to claim 1, wherein the record section of each of said separating regions has a length perpendicular to the direction of information arrangement in the corresponding information track, said length being variable along said direction of information arrangement.

5. An information recording medium comprising a plurality of information tracks on which information is recorded in accordance with a predetermined conversion system, said information tracks each including an information record section and being arranged in a first direction of information arrangement and in a second direction perpendicular to said first direction; and separating regions formed adjacent to forward and rearward areas of said information tracks in said first direction, said separating region adjacent to at least one of said forward and rearward areas including a record section which has at least a portion the width of which, in said second direction, is less than that of said information record section, and the record section of said separating region adjacent to at least one of said forward and rearward areas including a continuous and identical code which is longer than any continuous and identical code which can appear in accordance with said predetermined conversion system.

6. An information recording medium according to claim 5, wherein the entire width, in said second direction, of the record section of each of said separating regions is less than that of said information record section.

7. An information recording medium according to claim 5, wherein the location of the record section of each of said separating regions is deviated, in said second direction, relative to one of said information tracks adjacent in said first direction.

8. An information recording medium according to claim 5, wherein the separating region on said rearward area includes an end bit used to indicate the information of said information track.

9. An information recording medium according to claim 8, wherein said end bit has a bit pattern different between adjacent tracks in the direction substantially perpendicular to the direction of information arrangement in the corresponding information track.

10. An information recording medium comprising:
a plurality of information tracks on which information is recorded, said information tracks each including an information record section and being arranged in a first direction of information arrangement and in a second direction perpendicular to said first direction; and
separating regions each formed between pairs of said information tracks adjacent to each other in said first direction, each said separating region including a record section which has a width, in said second direction, varying continuously along said first direction.

11. An information recording medium comprising:
a plurality of information tracks on which information is recorded, said information tracks each including an information record section and being arranged in a first direction of information arrangement and in a second direction perpendicular to said first direction; and
separating regions formed adjacent to forward and rearward areas of said information tracks in said first direction, a separating region adjacent to at least one of said forward and rearward areas including a record section which has a width, in said second direction, varying continuously along said first direction.

* * * * *

UNITED STATES PATENT AND TRADEMARK OFFICE
CERTIFICATE OF CORRECTION

PATENT NO. : 4,912,311

DATED : March 27, 1990

INVENTOR(S) : KOYO HASEGAWA, ET AL.

It is certified that error appears in the above-identified patent and that said Letters Patent is hereby corrected as shown below:

Title page:

IN [30] FOREIGN APPLICATION PRIORITY DATA

"Sep. 10, 1988 [JP] Japan ........... 63-199923" should read --Sep. 10, 1985 [JP] Japan .......... 60-199923--.

IN [57] ABSTRACT

Line 6, "code" should read --code means--.

COLUMN 1

Line 4, "contrinuation-in-part" should read --continuation--.
Line 19, "to an" should read --to as an--.
Line 55, "band 3" should read --bands 3--.

COLUMN 3

Line 66, "FIG. 20" should read --FIG. 20.--.

COLUMN 4

Line 62, "a" should read --an--.

COLUMN 5

Line 54, "others" should be deleted.

COLUMN 6

Line 12, "track" should read --tracks--.

UNITED STATES PATENT AND TRADEMARK OFFICE
CERTIFICATE OF CORRECTION

PATENT NO. : 4,912,311

DATED : March 27, 1990

INVENTOR(S) : KOYO HASEGAWA, ET AL.

It is certified that error appears in the above-identified patent and that said Letters Patent is hereby corrected as shown below:

COLUMN 7

Line 34, "reading out" should read --reading-out--.
    Line 40, "inventron." should read --invention.--.

COLUMN 8

Line 16, "the same and one" should read --one and the same--.
    Line 25, "the same and one" should read --one and the same--.
    Line 58, "track" should read --tracks--.

COLUMN 9

Line 5, "b" should read --be--.
    Line 12, "initiates" should read --initiate--.

COLUMN 10

Line 13, "is" should read --are--.

COLUMN 11

Line 12, "tracks" should read --track--.

COLUMN 12

Line 19, "carriers" should read --carriers,--.
    Line 23, "which" should read --in which--.

UNITED STATES PATENT AND TRADEMARK OFFICE
CERTIFICATE OF CORRECTION

PATENT NO. : 4,912,311

DATED : March 27, 1990

INVENTOR(S) : KOYO HASEGAWA, ET AL.

It is certified that error appears in the above-identified patent and that said Letters Patent is hereby corrected as shown below:

COLUMN 13

Line 30, "the" should be deleted.
Line 31, "same and one" should read --one and the same--.
Line 67, "the same and one" should read --one and the same--.

COLUMN 14

Line 2, "be" should be deleted.
Line 12, "tracks." should read --track.--.

COLUMN 15

Line 4, "initiates" should read --initiate--.
Line 9, "according" should read --according to--.

COLUMN 17

Line 17, "center" should read --center.--.
Line 41, "track" should read --tracks--.
Line 63, "initiates" should read --initiate--.

COLUMN 18

Line 67, "011110000" should read --0111100001--.

UNITED STATES PATENT AND TRADEMARK OFFICE
CERTIFICATE OF CORRECTION

PATENT NO. : 4,912,311

DATED : March 27, 1990

INVENTOR(S) : KOYO HASEGAWA, ET AL.

It is certified that error appears in the above-identified patent and that said Letters Patent is hereby corrected as shown below:

COLUMN 19

Line 58, "tracks" should read --track--.

COLUMN 20

Line 58, "claim 5," should read --claim 6,--.

Signed and Sealed this

Twenty-first Day of January, 1992

Attest:

HARRY F. MANBECK, JR.

*Attesting Officer*  *Commissioner of Patents and Trademarks*